April 23, 1940.  J. KRIVUTZA  2,198,286
APPARATUS FOR FISHING THROUGH THE ICE
Filed April 22, 1939  4 Sheets-Sheet 1
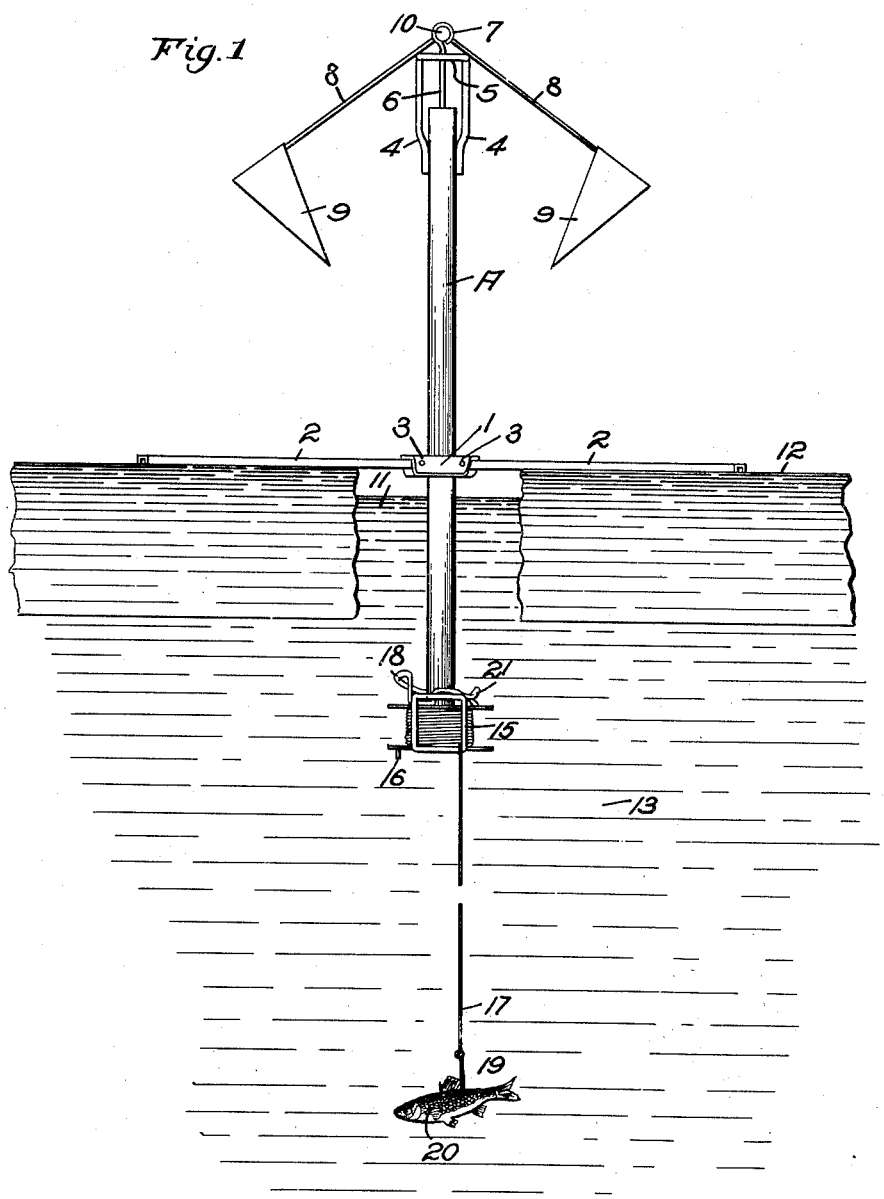

April 23, 1940.   J. KRIVUTZA   2,198,286
APPARATUS FOR FISHING THROUGH THE ICE
Filed April 22, 1939   4 Sheets-Sheet 2
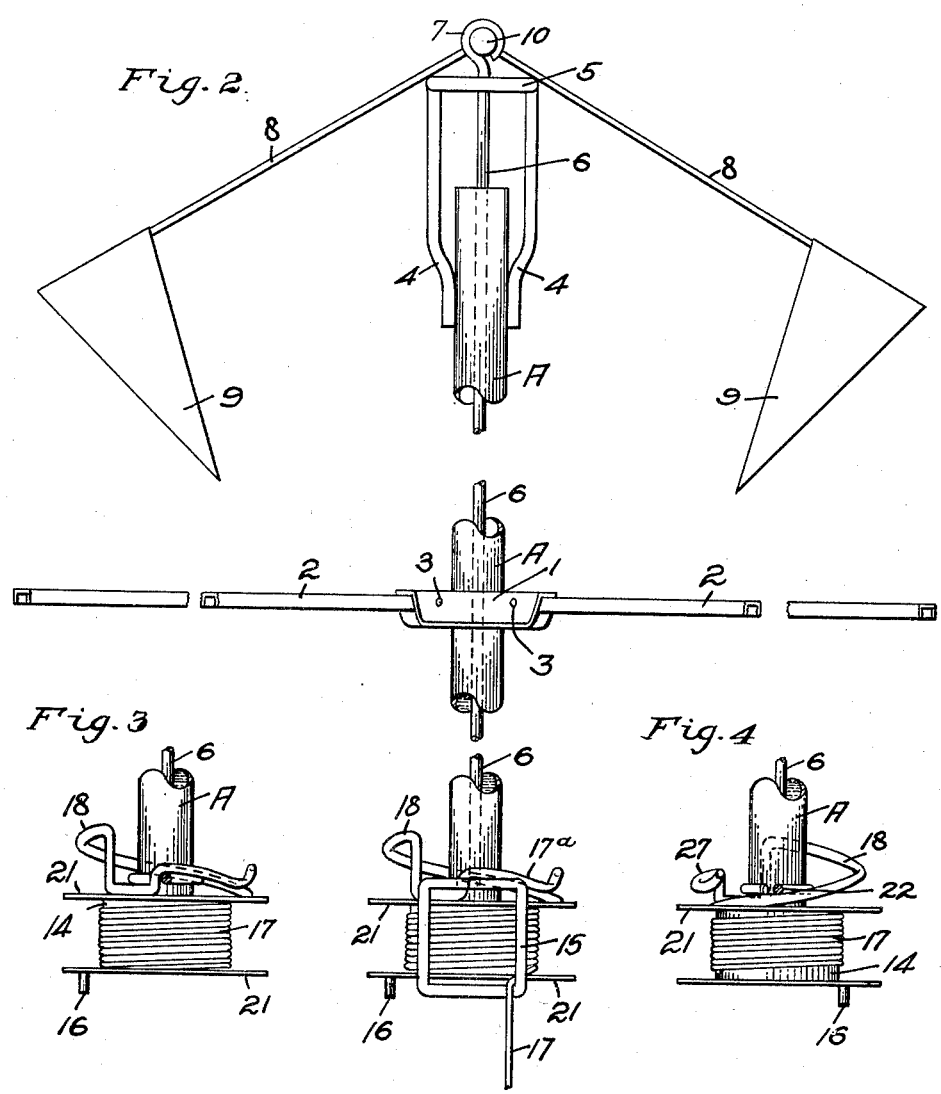
INVENTOR.
John Krivutza
BY
his ATTORNEYS

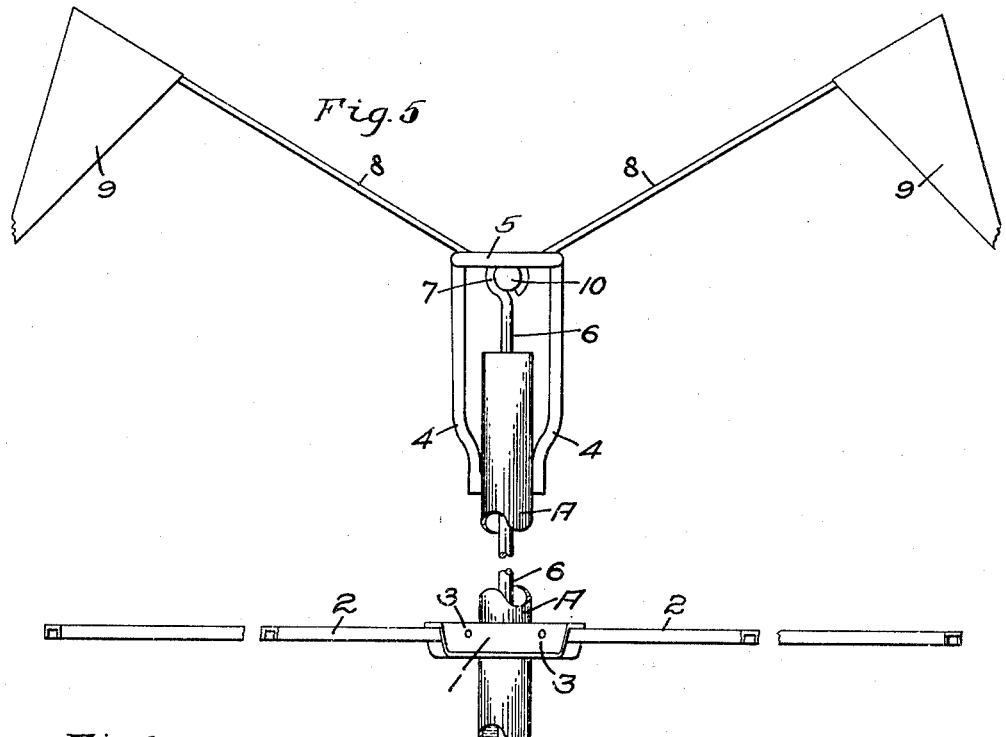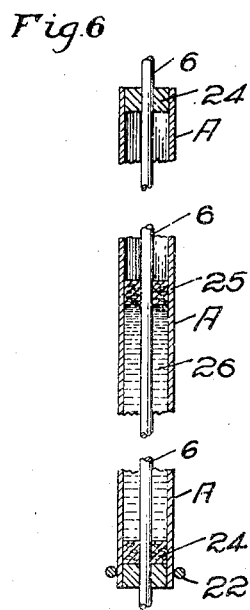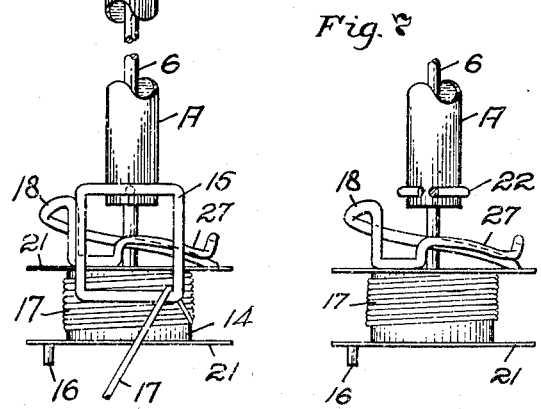

April 23, 1940.  J. KRIVUTZA  2,198,286
APPARATUS FOR FISHING THROUGH THE ICE
Filed April 22, 1939  4 Sheets-Sheet 4
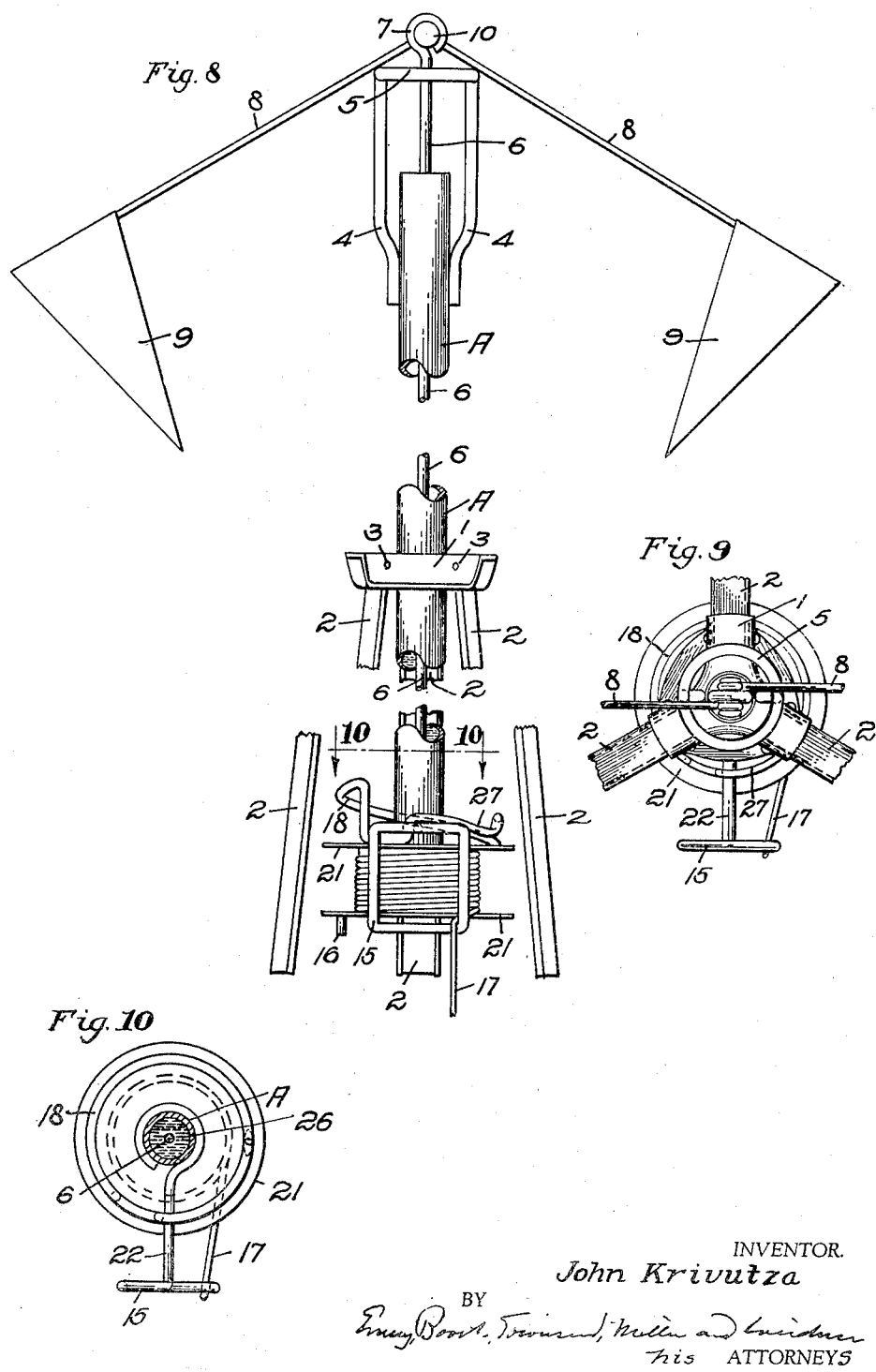
INVENTOR.
John Krivutza
BY
his ATTORNEYS Patented Apr. 23, 1940

2,198,286

UNITED STATES PATENT OFFICE 2,198,286

APPARATUS FOR FISHING THROUGH THE ICE

John Krivutza, East Rochester, N. Y.

Application April 22, 1939, Serial No. 269,438

13 Claims. (Cl. 43—17)

This invention relates to improved fishing apparatus intended for ice fishing, being of the type of apparatus commonly known as a "tip-up."

In order that the principle of the invention may be readily understood, I have disclosed a single embodiment thereof in the accompanying drawings, wherein—

Fig. 1 is a side elevation of the apparatus set and baited;

Fig. 2 is an enlarged side elevation of the apparatus, but with certain parts broken away more fully to show the structure, the apparatus being in the set position;

Fig. 3 is a detail of a part of Fig. 2 with parts broken away to show clearly the construction of the cam, the mechanism being positioned as in Fig. 1;

Fig. 4 is a detail in side elevation of a part of Fig. 2 with the spool in a different position, it having started to unwind under the influence of the fish just caught;

Fig. 5 is a view similar to Fig. 2 but within the tip-up has been operated and the signalling flags are in the position indicating a strike;

Fig. 6 is a detail in cross section showing the part of the structure having the anti-freeze section;

Fig. 7 is a detail in side elevation similar to Fig. 4 excepting that the spool has made at least one complete revolution, so that the tip-up is necessarily in the position of signalling a catch;

Fig. 8 is an enlarged side elevation similar to Fig. 2 but showing the legs of the tip-up folded for transportation;

Fig. 9 is a top plan view of Fig. 8 with portions of the mounting arms cut away; and Fig. 10 is a vertical section of Fig. 8 on the line 10—10 of Fig. 8.

In accordance with this invention, I have provided an apparatus requiring the minimum of attention on the part of the fisherman, and I have eliminated many of the faults common to other tip-ups. For instance, a gust of wind cannot falsely signal the fisherman nor can the apparatus be prevented from functioning due to the freezing of the water wherein the device is set up. I am enabled by my invention so to set the tension or drag that the apparatus will not be caused to function by the minnow or other live bait attached to the hook, and yet the mechanism remains sensitive enough to operate properly under the influence of the fish being hooked.

By my invention I have provided improved means for ice fishing wherein the operating parts are prevented from freezing during the time the fisherman is awaiting a strike. This is very important because in the usual structure after the fisherman has cut a hole in the ice and mounted his tip-up, it is necessary for him continuously to inspect the various tip-ups that he has set and to keep the ice broken away in the hole surrounding the tip-up. If this is not done the operating parts will be frozen into the ice, thus preventing the normal operation of the tip-up. Other requirements of a satisfactory ice fishing device are that it will surely function under any conditions and that it be simple to operate and can be manufactured at comparatively low cost. This is true in my invention. A further requirement of a satisfactory ice fishing device is that there must be no mistake in the signal sent out by the device. In the usual form of tip-up a gust of wind can so position the flag that the fisherman believes a strike has been made and he has no definite way of knowing to the contrary without inspection of the device itself. In accordance with my invention, I cause two different types of signalling. First, the flags are revolved and then they are raised from approximately forty-five degrees below a horizontal position to approximately forty-five degrees above a horizontal position, and as the fish continues to run the flags will revolve, thus giving a further indication of the catch.

It is necessary in a successfully operating device to have means for adjusting the operating parts so that the minnow or other live bait will not cause the apparatus to function, but will still be sufficiently sensitive so that even though a rather small fish takes the minnow the apparatus will function. This, of course, is to prevent having a small fish taking the bait and not operating the tip-up, in which case the apparatus will remain "set," unbaited, and therefore useless to the fisherman. All this is prevented by my invention.

Referring particularly to Fig. 1, I have shown at A a tube supported by a bracket 1 which is provided with supporting arms 2, 2 attached to said bracket by rivets 3, 3. The said bracket 1 and arms 2, 2 are desirably made so that they can be folded downward for transportation and so that they will stop in a horizontal plane when folded upward into the position shown in Fig. 1. Desirably all the parts excepting the flags are of metal, but any suitable material may be provided.

To the top of the tube A are attached wire brackets 4, 4 upon which is mounted a wire ring 5. Passing through the said tube A is a wire shaft 6 having a loop on its uppermost end, as shown at 7, to which are fastened flag arms 8 having flags 9, 9, by means of a shoulder rivet 10. The tube A is thrust through a hole 11 cut into the ice indicated at 12, and extends downward into the water indicated at 13, being held from sinking further into the water by the arms 2, 2. To the lower end of the shaft 6 is attached a spool 14 having a pin or handle 16 for turning said spool, a suitable fish line 17 and a cam-like structure 18, the function of which will be more fully set forth hereinafter. To the fish line 17 is attached a hook 19 to which, when fishing, is attached the bait 20 which is desirably a live minnow.

In Fig. 3 is represented a detail of the lower end of the tube A and shaft 6 provided with the spool 14. The said spool is provided with flanges 21, 21, between which the fish line 17 is wound. To the said upper flange 21 is attached a preferably metal piece here shown as the wire 18 bent into the form of a cam as stated, and having one end formed as in Fig. 3 to hook over a wire 22 attached to the tube A. The other end of said wire 22 is formed into a fish line guide 15. The position of the said wire 22 on the tube A is most clearly shown in Fig. 10.

Referring further to Fig. 1, it will be noted that the fish line guide 15 is shown in place and that the spool 14 and the end 17a of the cam 18 are positioned as in Fig. 3, which is the position when the apparatus is set for the purpose of catching fish.

Referring now to Fig. 4, it will be noted that the fish line guide 15 has been cut away in order more clearly to show the action of the cam 18 with relation to the wire 22. It will be assumed that a fish has been hooked and that the spool 14 is caused to turn in a contraclockwise direction under the influence of the fish line 17. The cam 18 which has been described as attached to the upper flange of the spool 14 will cause the said spool to be thrust downward under the influence of the cam 18 and the parts will thus be positioned as shown in Fig. 5, wherein it will be observed that the spool 14 has been thrust all the way down, carrying with it the shaft 6 through the tube A, the shoulder rivet 10, and the flag arms 8. Inasmuch as the ring 5 prevents any downward motion of the flag arms 8, they will necessarily pivot upon the ring 5, thus causing the flags 9 to be raised into the position shown in Fig. 5. As the hooked fish runs, the flags 9 will be caused to turn in a contraclockwise direction until the end of the fish line 17 wound on the spool 14 is reached, thus further signalling the operator. However, the flags 9 will still remain in the position shown in Fig. 5.

In order to prevent that portion of the shaft 5 from being frozen into the ice, the tube A extends well below the ice into the water, and hence is desirably made of very considerable length, because in northern lakes the ice frequently freezes to a depth of two or three feet.

The said tube A has a bearing at its lowermost end and also at the top of the tube through which the shaft 6 passes. Desirably a cork 24 or some other suitable packing, and a second cork 25, are placed well above and below the level of the water, the space between the corks 24 and 25 being filled with some suitable solution 26 whose freezing point is well below the temperature that may be encountered at the time of fishing.

It will be noted that the shaft 6 is free to be turned in the tube A or to be moved in a vertical direction in said tube.

I have just described the action of the apparatus when a fish is hooked. When that fish has been "landed," it is necessary to rewind the fish line 17 on the spool 14. This is done by means of a pin or handle 16, whereby the spool 14 is turned in a clockwise direction, thus winding the fish line 17 on the spool 14 until sufficient line has been rewound. The said spool 14 is then thrust upward, turning at the same time until the extended portion 27 of the cam 18 overlies the wire 22. The parts will then be in the position shown in Fig. 2 ready for another catch.

It will be noted that the cam end 27 has a slight downward bend over the pin 22. This bend can be changed or manipulated by the hands of the fisherman so as to cause more or less drag over the wire 22 when the spool 14 turns in a contraclockwise direction under the influence of pull on the fish line 17. This construction is for the purpose of adjusting the load required on the fish line 17 before the spool 14 can become disengaged and thrust in a downward direction so as to operate the signalling flags.

It will be evident from the foregoing description that I have provided a very simple means for ice fishing that entirely eliminates the faults of previous devices used for this purpose. The construction is so simple that it can be manufactured at a very low cost and the structure is such that it will normally be of very long life in spite of the rough usage to which it is necessarily subjected.

Having thus described one illustrative embodiment of the invention, it is to be understood that although specific terms are employed, they are used in a generic and descriptive sense and not for purposes of limitation, the scope of the invention being set forth in the following claims.

I claim:

1. A "tip-up" or apparatus for fishing through the ice comprising a tubular member adapted to be supported in upright position over a hole in the ice, so as to extend straight downward into the water, an upright shaft-like part supported within said tube and have at its lower end beyond the tube a spool and a small fishline, a signal carried by said shaft-like part at the upper end of said tube, and means whereby said signal is moved up and is also rotated when the fish is caught.

2. A "tip-up" or apparatus for fishing through the ice comprising a tubular member adapted to be supported in upright position over a hole in the ice, so as to extend straight downward into the water, an upright shaft-like part supported within said tube and having at its lower end beyond the tube a spool and a fishline, a signal carried by said shaft-like part at the upper end of said tube, said signal consisting of a flag-like member or members adapted by their connection with the shaft-like part to swing in upright paths when the fish is caught and also to rotate with said shaft-like part as an axis.

3. A "tip-up" or apparatus for fishing through the ice comprising a tubular member adapted to be supported in upright position over a hole in the ice so as to extend straight downward into the water, an upright shaft-like part supported within said tube and having at its lower end beyond the tube a spool and a fishline, a signal carried by said shaft-like part at the upper end of said tube, said spool having operatively associated therewith a cam to cause the spool to be thrust downward when a fish is caught, thereby axially moving the shaft-like part and operating the signal.

4. A "tip-up" or apparatus for fishing through the ice comprising a tube adapted to be supported in vertical position over a hole in the ice and having collapsible means secured thereto for supporting it over a hole in the ice, a shaft supported in said tube and having a flag-like signal at the upper end, said shaft having both an axial and a rotatory movement whereby both of said movements are communicated to said flag-like signal, said means including a spool attached to said shaft and adapted to carry a fishline, said tube having provisions for receiving therein an antifreeze substance in the part adapted to be submerged in the water.

5. A "tip-up" or apparatus for fishing through the ice comprising a tube adapted to be supported in vertical position over a hole in the ice and having arms pivoted thereto to be spread out on the upper surface of the ice or to be folded against the tube in non-use, a shaft supported in said tube and having at its lower end a spool and a small fishline, a signal pivotally connected to the upper end of said shaft so that upon the axial depression of said shaft so connected, the signal is swung in a vertical path, said signal being rotatable with the shaft when the fish-line is drawn from the spool.

6. A "tip-up" or apparatus for fishing through the ice comprising a tube adapted to be supported in vertical position over a hole in the ice so as to extend downward into the water, a shaft supported in said tube and having at its lower end a spool receiving a fishline, a signal pivoted to the upper end of said shaft, and means on said tube to cause an up and down swinging motion of said signal when a fish is caught, said signal being also rotatable with said shaft when the latter is rotated by the playing out of the fishline from the spool.

7. A "tip-up" or apparatus for fishing through the ice comprising a tube adapted to be supported in vertical position over a hole in the ice so as to extend downward in the water, a shaft received in said tube and having a spool and a fishline at its lower end, a signal connected to the upper part of said shaft so as to partake of the movements of said shaft, said spool carrying cam means of a material that may be flexed or bent manually by the user to vary the resistance of the spool to being depressed with the shaft when a fish is caught.

8. A "tip-up" or apparatus for fishing through the ice comprising a tube adapted to be supported in vertical position over a hole in the ice so as to extend downward into the water, a shaft received in said tube and having a spool and a fishline at its lower end, a signal connected to the upper part of said shaft so as to partake of the movements of said shaft, said spool carrying a wire cam, the shape of which may be changed by the hands of the user to vary the resistance of the spool to being depressed with said shaft when a fish is caught.

9. A "tip-up" or apparatus for fishing through the ice comprising a tube adapted to be supported vertically in position over a hole in the ice so as to extend downward into the water, a shaft supported in said tube and having a signal pivoted to the upper end thereof, said shaft having a spool attached to the lower end thereof to receive a fishline, and a wire cam connected to said spool and having a part bendable by the hands of the user to vary the drag of the spool when the fish is caught.

10. A "tip-up" or apparatus for fishing through the ice comprising a tube adapted to be supported in upright position over a hole in the ice with its lower end extending down into the water, a reciprocable and rotatable shaft supported in an upright position in said tube, a signal supported by the upper end of said shaft, a spool with a fish line supported upon the lower end of said shaft, and means whereby the catching of a fish causes the depression and then the rotation of said spool, whereby the signal is first moved upward and then is rotated.

11. A "tip-up" or apparatus for fishing through the ice comprising a tube adapted to be supported in upright position over a hole in the ice with its lower end extending down into the water, an axially movable and rotatable shaft supported in an upright position in said tube, a signal supported by the upper end of said shaft, a spool with a fish-line supported upon the lower end of said shaft, means whereby the catching of a fish causes the depression and then the rotation of said spool, whereby the signal is first moved upward and then is rotated, the means for supporting the tube in upright position over a hole in the ice being foldable in non-use against said tube, and said tube between the said spool and said supporting means being hollow and adapted for carrying an anti-freeze substance.

12. A "tip-up" or apparatus for fishing through the ice comprising a tube adapted to be supported in upright position over a hole in the ice, with its lower end extending down into the water, said supporting means being foldable in non-use against the said tube, an axially movable and rotatable shaft supported in upright position in said tube, a signal supported by the upper end of said shaft, a spool with a fish-line supported on the lower end of said shaft, means whereby the catching of a fish causes the depression and then the rotation of said spool, so that the signal is first moved upward and then is rotated, the said spool having cam means associated therewith for causing a drag, whereby the resistance of the signal being operated may be varied by the user of the apparatus.

13. A "tip-up" or apparatus for fishing through the ice comprising a tubular member adapted to be supported in upright position over a hole in the ice, so as to extend straight downward into the water, an upright shaft-like part supported within said tube and having at its lower end beyond the tube a spool and a fishline, a signal carried by said shaft-like part at the upper end of said tube, the said spool having attached thereto a cam for effecting a downward thrust of the spool when the fish is caught, thereby to move axially of the shaft-like part, the said signal being so connected to the shaft-like part as, upon axial movement of the shaft, to be swung in an upright path and to be rotated upon rotation of the spool.

JOHN KRIVUTZA.